US011782564B2

(12) United States Patent
Kim et al.

(10) Patent No.: US 11,782,564 B2
(45) Date of Patent: Oct. 10, 2023

(54) TOUCH SENSOR-ANTENNA MODULE AND DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Yun Seok Oh, Gyeonggi-do (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 138 days.

(21) Appl. No.: 17/492,794

(22) Filed: Oct. 4, 2021

(65) Prior Publication Data

US 2022/0027013 A1   Jan. 27, 2022

Related U.S. Application Data

(63) Continuation of application No. PCT/KR2020/004503, filed on Apr. 2, 2020.

(30) Foreign Application Priority Data

Apr. 4, 2019   (KR) .......... 10-2019-0039638

(51) Int. Cl.
*G06F 3/044* (2006.01)
*G06F 1/16* (2006.01)
*G06F 3/041* (2006.01)

(52) U.S. Cl.
CPC .......... *G06F 3/0446* (2019.05); *G06F 1/1643* (2013.01); *G06F 1/1698* (2013.01); *G06F 3/0412* (2013.01); *G06F 2203/04112* (2013.01)

(58) Field of Classification Search
CPC .... G06F 3/0446; G06F 3/0412; G06F 1/1643; G06F 1/1698

(Continued)

(56) References Cited

U.S. PATENT DOCUMENTS

2012/0105081 A1   5/2012   Shaikh et al.
2017/0125897 A1*  5/2017   Rubin ................ C23C 4/12
(Continued)

FOREIGN PATENT DOCUMENTS

KR   10-2003-0095557 A   12/2003
KR   10-2011-0093549 A   8/2011
(Continued)

OTHER PUBLICATIONS

Lee Hyun Jae Touch Screen Panel Having Antenna Pattern and Display Device Having the Same Aug. 18, 2014 Samsung Display Co Ltd KR20140100822 (A) paragraphs 33-81 figures 1-7 English.*

(Continued)

*Primary Examiner* — Prabodh M Dharia
(74) *Attorney, Agent, or Firm* — The PL Law Group, PLLC (57) ABSTRACT

A touch sensor-antenna module according to an embodiment of the present disclosure includes a substrate layer having an active region and a bonding region, a touch sensor electrode layer on the substrate layer, the touch sensor electrode layer including sensing electrodes disposed on the active region, traces extending from the sensing electrodes, and touch sensor pads disposed on the bonding region to be connected to terminal end portions of the traces, a radiator on the substrate layer, and an antenna pad disposed on the bonding region together with the touch sensor pads to be electrically connected to the radiator.

17 Claims, 4 Drawing Sheets

(58) Field of Classification Search
USPC .......................................................... 345/173
See application file for complete search history.

(56) References Cited

U.S. PATENT DOCUMENTS

2017/0131808 A1* 5/2017 Yeh ........................ H01Q 1/44
2017/0139520 A1* 5/2017 Yeh ........................ H01Q 9/30
2020/0019264 A1* 1/2020 Kadota .................. H10K 59/40
2021/0382572 A1* 12/2021 Lee ....................... H10K 59/40

FOREIGN PATENT DOCUMENTS

| KR | 10-2014-0100822 A | 8/2014 |
| KR | 10-2015-0133668 A | 11/2015 |
| KR | 10-2018-0054069 A | 5/2018 |
| KR | 10-2018-0101064 A | 9/2018 |
| KR | 10-1940798 B1 | 1/2019 |
| WO | WO 2013/063176 A1 | 5/2013 |

OTHER PUBLICATIONS

Lee Hyun Jae Touch Screen Panel Having Antenna Pattern and Display Device Having the Same Aug. 18, 2014 Samsung Display Co Ltd KR20140100822 (A) paragraphs 33-81 figures 1-7 Korean.*
International Search Report for PCT/KR2020/004503 dated Jul. 6, 2020.

* cited by examiner

TOUCH SENSOR-ANTENNA MODULE AND DISPLAY DEVICE INCLUDING THE SAME

CROSS REFERENCE TO RELATED APPLICATIONS AND CLAIM OF PRIORITY

The present application is a continuation application to International Application No. PCT/KR2020/004503 with an International Filing Date of Apr. 2, 2020, which claims the benefit of Korean Patent Application No. 10-2019-0039638 filed on Apr. 4, 2019 at the Korean Intellectual Property Office, the disclosures of which are incorporated by reference herein in their entirety.

BACKGROUND

1. Field

The present invention relates to a touch sensor-antenna module and a display device including the same. More particularly, the present invention related to a touch sensor-antenna module including an antenna unit and a touch sensing structure, and a display device including the same.

2. Description of the Related Art

As information technologies have been developed, a wireless communication technology such as Wi-Fi, Bluetooth, etc., is combined with a display device in, e.g., a smartphone. In this case, an antenna may be combined with the display device to provide a communication function.

Mobile communication technologies have been rapidly developed, an antenna capable of operating a high or ultra-high frequency communication of, e.g., 3G to 5G band is needed in the display device.

Further, a touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device. For example, as disclosed in Korean Published Patent Application No. 2014-0092366, various image display devices combined with a touch screen panel including a touch sensor has been developed recently.

When an antenna electrode and the touch sensing electrodes are included together within a limited size and design of the image display device, desirable gain properties of the antenna may not be achieved due to a mutual signal interference, and a resolution of the touch sensor may also be deteriorated. Further, bonding with an integrated circuit chip for controlling each of the antenna and the touch sensor within the limited size and design of the image display device may not be easily implemented.

For example, Korean Published Patent Application No. 2003-0095557 discloses an antenna structure embedded in a portable terminal, but does not consider compatibility with other electrical elements such as a touch sensor.

SUMMARY

According to an aspect of the present invention, there is provided a touch sensor-antenna module having improved signaling efficiency and reliability.

According to an aspect of the present invention, there is provided a display device including a touch sensor-antenna module with improved signaling efficiency and reliability.

The above aspects of the present invention will be achieved by the following features or constructions:

(1) A touch sensor-antenna module, including: a substrate layer having an active region and a bonding region; a touch sensor electrode layer on the substrate layer, the touch sensor electrode layer including: sensing electrodes disposed on the active region; traces extending from the sensing electrodes; and touch sensor pads disposed on the bonding region to be connected to terminal end portions of the traces; a radiator on the substrate layer; and an antenna pad disposed on the bonding region together with the touch sensor pads to be electrically connected to the radiator.

(2) The touch sensor-antenna module of the above (1), wherein the touch sensor pads and the antenna pad form a pad row on the bonding region.

(3) The touch sensor-antenna module of the above (2), wherein the pad row includes a plurality of antenna pads, and at least two of the touch sensor pads are arranged between neighboring antenna pads of the plurality of antenna pads.

(4) The touch sensor-antenna module of the above (3), wherein a distance between the neighboring antenna pads is equal to or greater than half a wavelength corresponding to a resonance frequency of the radiator.

(5) The touch sensor-antenna module of the above (2), wherein the pad row further includes a ground pad disposed around the antenna pad.

(6) The touch sensor-antenna module of the above (5), wherein the ground pad includes a pair of ground pads facing each other with the antenna pad interposed therebetween.

(7) The touch sensor-antenna module of the above (1), wherein the touch sensor pads and the antenna pad are located at the same level.

(8) The touch sensor-antenna module of the above (1), wherein the antenna pad is located at an upper level from the touch sensor pads.

(9) The touch sensor-antenna module of the above (8), further including an insulating layer covering the sensing electrodes, wherein the antenna pad is disposed on the insulating layer.

(10) The touch sensor-antenna module of the above (8), further including a capping pattern disposed on the touch sensor pads.

(11) The touch sensor-antenna module of the above (10), further including a capping layer formed on the antenna pad.

(12) The touch sensor-antenna module of the above (10), wherein the capping pattern includes a transparent conductive oxide.

(13) The touch sensor-antenna module of the above (1), further including a flexible printed circuit board bonded together with the antenna pad and the touch sensor pads on the bonding region.

(14) The touch sensor-antenna module of the above (13), further including an antenna driving integrated circuit chip and a touch sensor driving integrated circuit chip electrically connected to the antenna pad and the touch sensor pads, respectively, through the flexible printed circuit board.

(15) The touch sensor-antenna module of the above (1), wherein the radiator and the sensing electrodes have a mesh structure.

(16) The touch sensor-antenna module of the above (1), wherein the radiator and the sensing electrodes are disposed at the same level.

(17) A display device comprising the touch sensor-antenna module according to exemplary embodiments.

According to embodiments of the present invention, a touch sensor-antenna module may include an antenna pad and a touch sensor pad together in the same row in a planar view. Accordingly, the pads may be formed by a single process without allocating an additional area for the formation of pads for driving the antenna. Additionally, an antenna pad bonding process may also be performed when performing a touch sensor pad bonding process.

In some embodiments, a plurality of the touch sensor pads may be arranged between the antenna pads to obtain a proper separation distance for shielding a mutual signal interference and noise.

In some embodiments, a ground pad may be disposed around the antenna pad to prevent a mutual interference with the touch sensor pad and to also implement a horizontal radiation property.

DETAILED DESCRIPTION OF THE EMBODIMENTS

According to exemplary embodiments of the present invention, a touch sensor-antenna module including a touch sensor electrode layer and an antenna layer, and including touch sensor pads and antenna pads in a bonding region is provided. Further, a display device having improved signaling reliability and efficiency from the touch-sensor-antenna module is provided.

Figure 1:
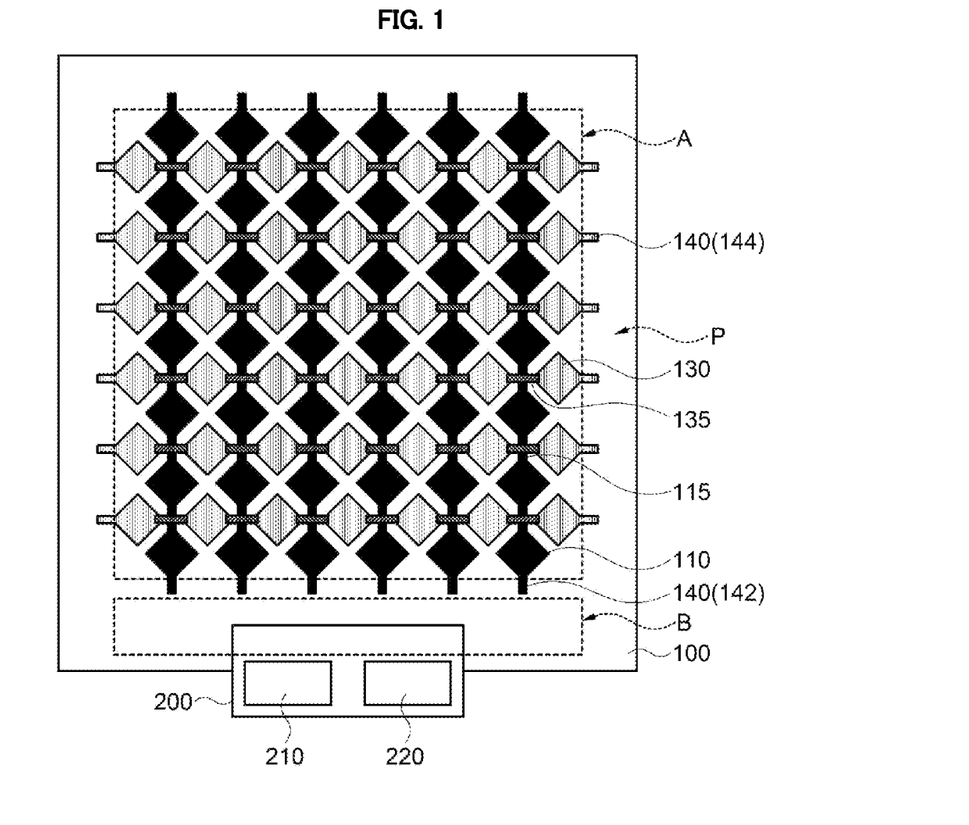
FIGS. 1 and 2 are a schematic top planar view and a schematic cross-sectional view, respectively, illustrating a construction of touch sensing electrodes in a touch sensor-antenna module in accordance with exemplary embodiments.
Figure 2:
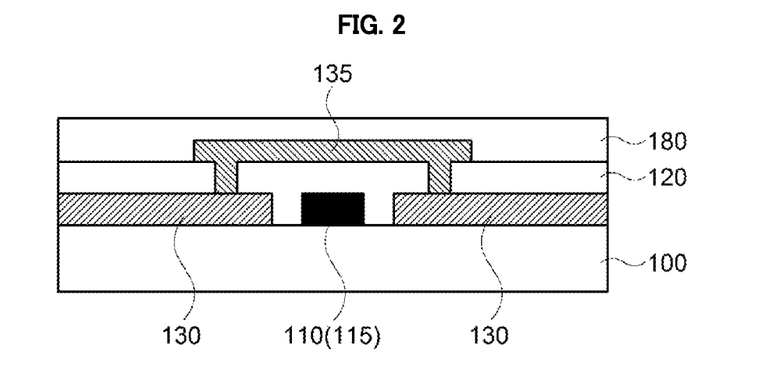

FIGS. 1 and 2 are a schematic top planar view and a schematic cross-sectional view, respectively, illustrating a construction of touch sensing electrodes in a touch sensor-antenna module in accordance with exemplary embodiments. Specifically, FIG. 2 is a cross-sectional view taken along a line I-I' of FIG. 1 in a thickness direction. For convenience of descriptions, illustration of traces and pads is omitted in FIG. 1.

Referring to FIGS. 1 and 2, a touch sensor electrode layer may be disposed on a substrate layer 100. The touch sensor electrode layer may include sensing electrodes 110 and 130.

The substrate layer 100 may include a support layer, an insulating interlayer, or a film-type substrate for forming the sensing electrodes 110 and 130. For example, the substrate layer 100 may include a film material commonly used in a touch sensor without any particular limitation, and may include, e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), poly methyl methacrylate (PMMA), etc. Examples of the inorganic insulating material may include silicon oxide, silicon nitride, silicon oxynitride, a metal oxide, etc.

In some embodiments, a layer or a film member of an image display device into which the touch sensor is inserted may serve as the substrate layer 100. For example, an encapsulation layer or a passivation layer included in a display panel may serve as the substrate layer 100.

An upper surface of the substrate layer 100 may include an active region A and a peripheral region P around the active region A. The sensing electrodes 110 and 130 may be arranged on the active region A of the substrate layer 100.

The sensing electrodes 110 and 130 may be disposed on the upper surface of the substrate layer 100 in the active region A. When a user's touch is input onto the active region A, a change in capacitance may occur by the sensing electrodes 110 and 130. Accordingly, the physical touch may be converted into an electrical signal to perform a predetermined sensing function.

The sensing electrodes 110 and 130 may include first sensing electrodes 110 and second sensing electrodes 130. The first sensing electrodes 110 and the second sensing electrodes 130 may be arranged in directions crossing each other. The first sensing electrodes 110 and the second sensing electrodes 130 may be located at the same level on the upper surface of the substrate layer 100.

For example, the first sensing electrodes 110 may be arranged along a column direction (e.g., a Y direction). The first sensing electrodes 110 may be connected along the column direction by a sensing electrode connector 115. The sensing electrode connector 115 may be integrally connected to the first sensing electrodes 110 to be provided as a substantially single member.

A plurality of the first sensing electrodes 110 may be connected by the sensing electrode connector 115 to form a sensing channel column extending in the column direction. A plurality of the sensing channel columns may be arranged in a row direction (e.g., an X direction).

The second sensing electrodes 130 may be arranged along the row direction. Each of the second sensing electrodes 130 may have a spaced island pattern shape. The second sensing electrodes 130 neighboring in the row direction may be electrically connected to each other by a bridge electrode 135.

For example, a pair of the second sensing electrodes 130 neighboring each other with the sensing electrode connector 115 included in the sensing channel column interposed therebetween may be electrically connected to each other by the bridge electrode 135. Accordingly, a sensing channel row may be defined by a plurality of the second sensing electrodes 130 and the bridge electrode 135 connected in the row direction. A plurality of the sensing channel rows may be arranged along the column direction.

As shown in FIG. 2, an insulating layer 120 covering the first and second sensing electrodes 110 and 130 may be formed, and the bridge electrode 135 may penetrate through the insulating layer 120 to connect the neighboring second sensing electrodes 130 to each other.

The first and second sensing electrodes 110 and 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), (Mo), calcium (Ca), tin (Sn), or an alloy containing at least one of the metals. These may be used alone or in a combination therefrom.

In an embodiment, the first and second sensing electrodes 110 and 130 may include silver (Ag) or a silver alloy such as a silver-palladium-copper (APC) alloy for implementing a low resistance.

In an embodiment, the first and second sensing electrodes 110 and 130 may include copper (Cu) or a copper alloy in consideration of low resistance and pattern formation with a fine line width. For example, the first and second sensing electrodes 110 and 130 may include a copper-calcium (Cu—Ca) alloy.

For example, the first and second sensing electrodes 110 and 130 may have a mesh structure including the metal or the alloy.

The first and second sensing electrodes 110 and 130 may include a transparent conductive oxide such as indium tin oxide (ITO), indium zinc oxide (IZO), zinc oxide (ZnO), indium zinc tin oxide (IZTO), cadmium tin oxide (CTO), etc., or a transparent conductive material such as silver nanowire (AgNW), carbon nanotube (CNT), graphene, a conductive polymer, etc.

In some embodiments, the first and second sensing electrodes 110 and 130 may have a multi-layered structure including a transparent conductive oxide layer and a metal layer. For example, the first and second sensing electrodes 110 and 130 may have a double-layered structure of a transparent conductive oxide layer-a metal layer or a triple-layered structure of a transparent conductive oxide layer-a metal layer-a transparent conductive oxide layer. In this case, a flexible property may be enhanced by the metal layer so that a resistance may be reduced and a signal transfer speed may be improved. Further, a resistance to corrosion and a transparency may be enhanced by the transparent conductive oxide layer.

Each of the sensing electrodes 110 and 130 is illustrated as having a rhombus pattern shape in FIG. 1, but the shape of the sensing electrodes 110 and 130 may be changed appropriately in consideration of a pattern density, an optical matching with an image display device, etc. For example, the sensing electrodes 110 and 130 may be formed to have a wavy edge.

In FIG. 1, the column direction sensing electrodes are integrally connected by the sensing electrode connector and the row direction sensing electrodes are connected by the bridge electrode. However, the terms "the column and row directions" are used to relatively refer to two different direction and are not intended to limit specific directions.

Further, the number of sensing channel rows and sensing channel columns, and the number of sensing electrodes included therein as shown in FIG. 1 are only partially illustrated for convenience of descriptions, and may be increased according to an area of the active region A.

The peripheral region P may be defined as a region around a periphery of the active region A. For example, a region surrounding the periphery of the active region A may be defined as the peripheral region P.

Figure 3:
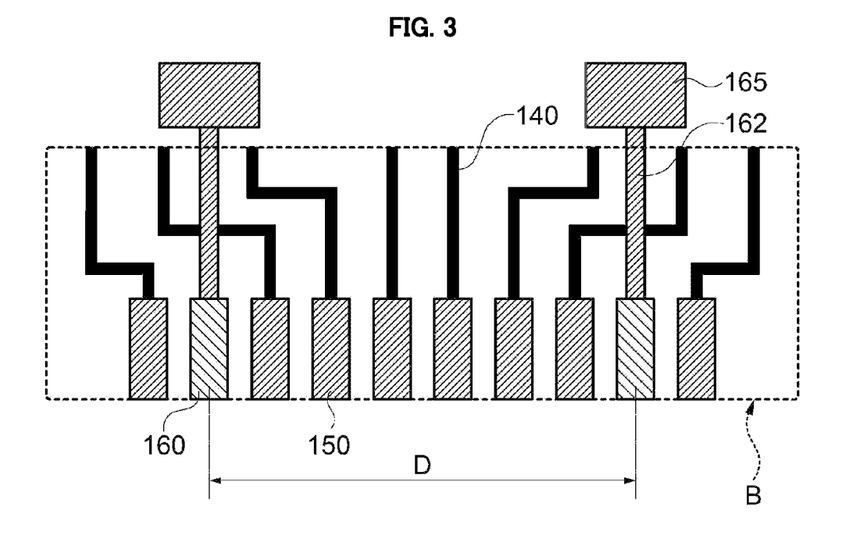
FIG. 3 is a schematic top planar view illustrating an arrangement of pads and an antenna unit in a touch sensor-antenna module in accordance with exemplary embodiments.

The touch sensor electrode layer may further include traces 140 and touch sensor pads 150 (see FIG. 3).

The traces 140 may be branched from each sensing channel row and sensing channel column and may extend on the peripheral region P. The traces 140 may include first traces 142 branching from the sensing channel columns and second traces 144 branching from the sensing channel rows. The traces 140 may include a conductive material and/or a stacked structure substantially the same as or similar to those of the sensing electrodes 110 and 130.

The traces 140 may extend on the peripheral region P and may be collected in a bonding region B. The touch sensor pads 150 connected to terminal ends of the traces 140 may be disposed in the bonding region B.

The touch sensor pads 150 and an antenna pad 160 (see FIG. 3) may be bonded to a circuit connection structure such as a flexible printed circuit board (FPCB) 200 on the bonding region B. A touch sensor driving integrated circuit (IC) chip 210 and an antenna driving IC chip 220 may be disposed on the flexible printed circuit board 200.

An electrical connection between the touch sensor driving IC chip 210 and the touch sensor pad 150 may be implemented through the flexible printed circuit board 200, and an electrical connection between the antenna driving IC chip 220 and the antenna pad 160 may also be implemented through the flexible printed circuit board 200. Accordingly, an antenna feeding and a touch sensing signal transmission may be performed together from one flexible circuit board 200.

In an embodiment, the touch sensor driving integrated circuit (IC) chip 210 and the antenna driving IC chip 220 may be directly mounted on a surface of the flexible printed circuit board 200.

In an embodiment, the flexible printed circuit board 200 may be connected to a rigid printed circuit board. The touch sensor driving integrated circuit (IC) chip 210 and the antenna driving IC chip 220 may be mounted on the rigid printed circuit board.

As illustrated in FIGS. 1 and 2, the sensing electrodes 110 and 130 may be arranged by a mutual capacitance type arrangement.

In some embodiments, the sensing electrodes 110 and 130 may be arranged by a self-capacitance type arrangement. In this case, each of the sensing electrodes 110 and 130 may have an independent island pattern shape, and the traces 140 may each be branched from the sensing electrodes 110 and 130 each having the island pattern shape. Further, the sensing electrode connector 115 and the bridge electrode 135 may be omitted.

FIG. 3 is a schematic top planar view illustrating an arrangement of pads and an antenna unit in a touch sensor-antenna module in accordance with exemplary embodiments.

Referring to FIG. 3, as described above, the touch sensor pads 150 may be connected to terminal end portions of the traces 140 in the bonding region B. In exemplary embodiments, the antenna pads 160 may be arranged together with the touch sensor pads 150 in the bonding region B.

In exemplary embodiments, the antenna pads 160 and the touch sensor pads 150 may define a pad row in a planar view. For example, a plurality of the touch sensor pads 150 and the antenna pads 160 may be repeatedly arranged randomly or regularly in one pad row.

In some embodiments, a plurality of the antenna pads 160 may be included in the pad row, and a plurality of the touch sensor pads 150 may be arranged between the adjacent antenna pads 160.

The touch sensor pads 150 may be arranged between the adjacent antenna pads 160 in consideration of a separation distance for suppressing a mutual radiation interference between antenna units. In some embodiments, a distance between adjacent the antenna pads 160 (e.g., a distance between center lines of the antenna pads 160) may be equal to or greater than half a wavelength (212) corresponding to a resonance frequency of the antenna unit.

The antenna unit may be electrically connected to the antenna pad 160. The antenna unit may include a radiator 165 and a transmission line 162.

The transmission line 162 may branch and extend from the radiator 165 and may be electrically connected to the antenna pad 160. The transmission line 162 may be provided as a single member substantially integral with the radiator 165.

The radiator 165 and/or the transmission line 162 may include the above-described metal or alloy. The radiator 165 and/or the transmission line 162 may include a transparent conductive oxide described above. The radiator 165 and/or the transmission line 162 may include the above-described stacked structure of the transparent conductive oxide layer and the metal layer.

In some embodiments, the radiator 165 and/or the transmission line 162 may have a mesh structure including, e.g., the aforementioned metal or alloy. Further, the sensing electrodes 110 and 130 may also have the mesh structure. In this case, the transmittance of the touch sensor-antenna module may be improved.

In an embodiment, the antenna pad 160 and the touch sensor pad 150 may have a solid structure including the metal or the alloy to reduce signal resistance or channel resistance. In an embodiment, at least a portion of the transmission line 162 may have the solid structure.

In an embodiment, the antenna unit may be located at an upper layer or an upper level than that of the antenna pads 160. In this case, the antenna unit may be disposed on the insulating layer 120, and the transmission line 162 may be electrically connected to the antenna pad 160 through a contact penetrating the insulating layer 120.

In an embodiment, the antenna unit may be located at the same layer or at the same level as that of the antenna pads 160. In this case, the antenna unit and the antenna pads 160 may be disposed commonly on the insulating layer 120.

For example, the radiator 165 may be disposed between the active region A and the bonding region B illustrated in FIG. 1. The radiator 165 may be formed on the insulating layer 120 and located at the upper level of the sensing electrodes 110 and 130. Accordingly, an antenna radiation from the radiator 165 may be prevented from being shielded or interfered by the sensing electrodes 110 and 130.

In some embodiments, the antenna unit or the radiator 165 may be located at the same layer or at the same level as that of the sensing electrodes 110 and 130. In this case, for example, the transmission line 162 may not cross the traces 140 on the same plane.

As described above, the antenna pad 160 and the touch sensor pad 150 may be arranged together in the bonding region B so that a bonding process for the connection with the touch sensor driving IC chip 210 and the antenna driving IC chip 220 may be performed in one region.

Figure 4:
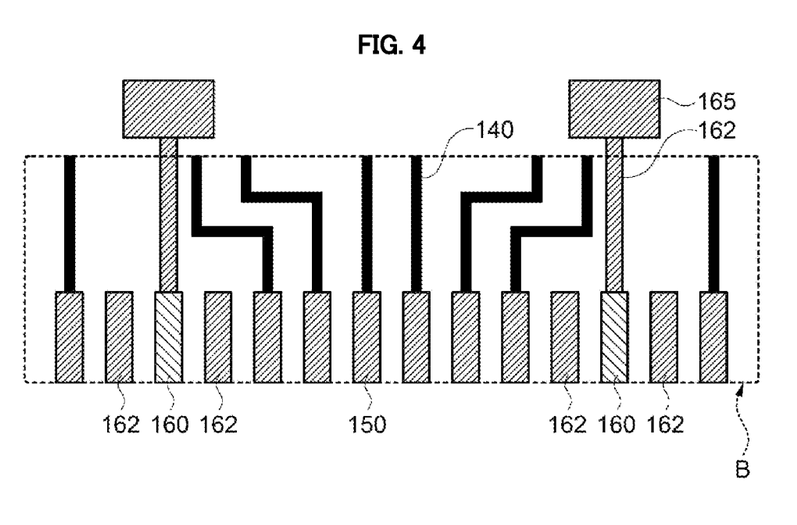
FIG. 4 is a schematic top planar view illustrating an arrangement of pads and an antenna unit in a touch sensor-antenna module in accordance with some exemplary embodiments.

FIG. 4 is a schematic top planar view illustrating an arrangement of pads and an antenna unit in a touch sensor-antenna module in accordance with some exemplary embodiments.

Referring to FIG. 4, a ground pad 162 may be disposed around the antenna pad 160. In exemplary embodiments, a pair of the ground pads 162 may be disposed to face each other with the antenna pad 160 interposed therebetween. The ground pad 162 may be spaced apart from the antenna pad 160 and the touch sensor pad 150, and may be included in the pad row in the bonding area B together with the antenna pad 160 and the touch sensor pad 150.

The ground pads 162 may be disposed around the antenna pad 160, so that a mutual interference and noise between the antenna pad 160 and the touch sensor pad 150 may be shielded. Further, a horizontal radiation may be implemented by the ground pads 162 together with a vertical radiation through the radiator 165.

Figure 5:
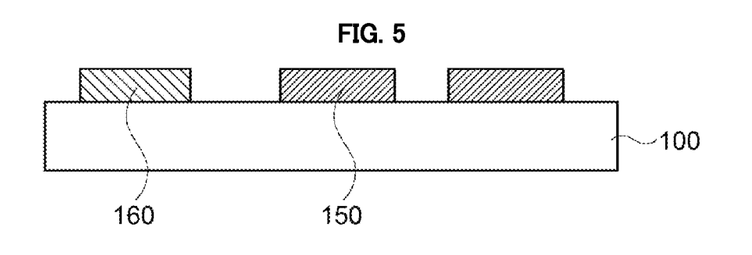
FIG. 5 is a schematic cross-sectional view illustrating a pad arrangement in a touch sensor-antenna module in accordance with exemplary embodiments.

FIG. 5 is a schematic cross-sectional view illustrating a pad arrangement in a touch sensor-antenna module in accordance with exemplary embodiments.

Referring to FIG. 5, the antenna pad 160 and the touch sensor pad 150 may be located at the same layer or at the same level. For example, the antenna pad 160 and the touch sensor pad 150 may be arranged together on a top surface of the substrate layer 100.

In this case, the insulating layer 120 may at least partially cover the antenna pad 160, and the antenna unit may be disposed on the insulating layer 120. The transmission line 162 of the antenna unit may be electrically connected to the antenna pad 160 through a contact penetrating the insulating layer 120.

Figure 6:
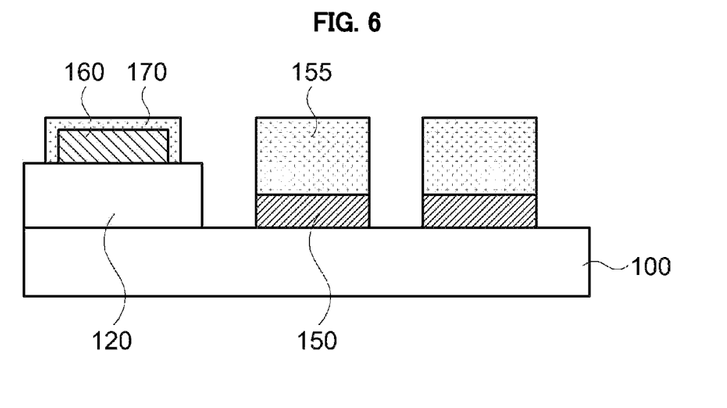
FIG. 6 is a schematic cross-sectional view illustrating a pad arrangement in a touch sensor-antenna module in accordance with some exemplary embodiments.

FIG. 6 is a schematic cross-sectional view illustrating a pad arrangement in a touch sensor-antenna module in accordance with exemplary embodiments.

Referring to FIG. 6, the antenna pad 160 may be located at an upper level from the touch sensor pad 150. For example, the touch sensor pad 150 may be disposed on the top surface of the substrate layer 100, and the antenna pad 160 may be disposed on the insulating layer 120.

In some embodiments, a capping pattern 155 may be formed on the touch sensor pad 150. A step difference with the antenna pad 160 disposed at the upper level may be reduced or removed by the capping pattern 155, so that bonding reliability of the flexible printed circuit board 200 may be improved.

In an embodiment, a capping layer 170 may also be formed on the antenna pad 160. The capping layer 170 may be formed from the same conductive layer as that of the capping pattern 155 by substantially the same etching process.

The capping layer 170 may be formed on top surface and sidewalls of the antenna pad 160. In an embodiment, the capping pattern 155 may also cover the top surface and the sidewall of the touch sensor pad 150.

In an embodiment, the capping pattern 155 or the capping layer 170 may include a transparent conductive oxide such as ITO or IZO. In this case, oxidation and corrosion of the touch sensor pad 150 and the antenna pad 160 by an external air may be prevented.

Figure 7:
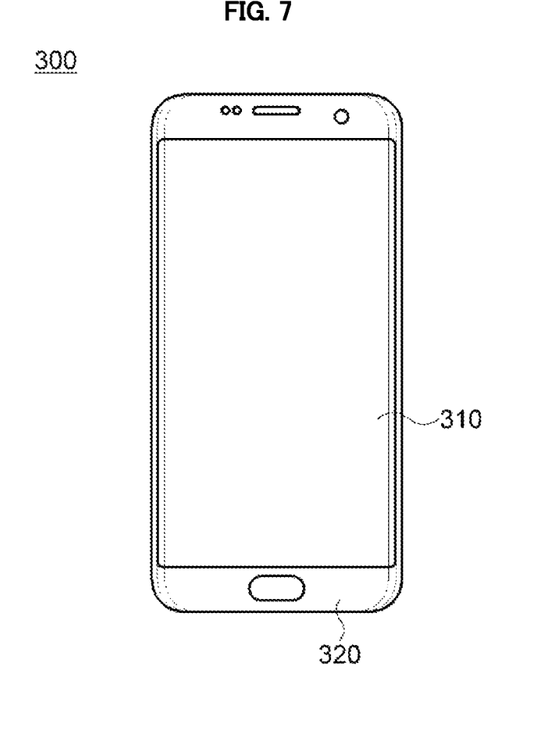
FIG. 7 is a schematic top planar view illustrating a display device in accordance with some exemplary embodiments.

FIG. 7 is a schematic top planar view illustrating a display device in accordance with exemplary embodiments. For example, FIG. 7 illustrates an outer shape including a window of a display device.

Referring to FIG. 7, a display device 300 may include a display region 310 and a peripheral region 320. The peripheral region 320 may correspond to both end portions and/or both lateral portions around the display region 310. The peripheral region 320 may correspond to or overlap the peripheral region P of the touch sensor-antenna module.

The pads 150 and 160 of the touch sensor-antenna module may be disposed in the peripheral region 320, and the driving IC chips 210 and 220 may be disposed together in the peripheral region 320. The pads 150 and 160 may be disposed to be adjacent to the driving IC chips 210 and 220 in the peripheral region 320, so that a signal transmission/reception path may be shortened and a signal loss may be suppressed. Additionally, the antenna pad 160 and the touch sensor pad 150 may be arranged together in the one pad row, so that a mounting space of the driving IC chips 210 and 220 may be reduced.

In some embodiments, at least a portion of the radiator 165 included in the antenna unit may be disposed in the display area 310. As described above, a visual recognition of the radiators 165 may be reduced by using the mesh structure.

What is claimed is:

1. A touch sensor-antenna module, comprising:
    a substrate layer having an active region and a bonding region;
    a touch sensor electrode layer on the substrate layer, the touch sensor electrode layer comprising:
        sensing electrodes disposed on the active region;
        traces extending from the sensing electrodes; and
        touch sensor pads disposed on the bonding region to be connected to terminal end portions of the traces;
    a radiator on the substrate layer, the radiator disposed between the active region and the bonding region; and
    an antenna pad disposed on the bonding region together with the touch sensor pads to be electrically connected to the radiator.

2. The touch sensor-antenna module of claim 1, wherein the touch sensor pads and the antenna pad form a pad row on the bonding region.

3. The touch sensor-antenna module of claim 2, wherein the pad row comprises a plurality of antenna pads; and
    at least two of the touch sensor pads are arranged between neighboring antenna pads of the plurality of antenna pads.

4. The touch sensor-antenna module of claim 3, wherein a distance between the neighboring antenna pads is equal to or greater than half a wavelength corresponding to a resonance frequency of the radiator.

5. The touch sensor-antenna module of claim 2, wherein the pad row further comprises a ground pad disposed around the antenna pad.

6. The touch sensor-antenna module of claim 5, wherein the ground pad comprises a pair of ground pads facing each other with the antenna pad interposed therebetween.

7. The touch sensor-antenna module of claim 1, wherein the touch sensor pads and the antenna pad are located at the same level.

8. The touch sensor-antenna module of claim 1, wherein the antenna pad is located at an upper level from the touch sensor pads.

9. The touch sensor-antenna module of claim 8, further comprising an insulating layer covering the sensing electrodes, wherein the antenna pad is disposed on the insulating layer.

10. The touch sensor-antenna module of claim 8, further comprising a capping pattern disposed on the touch sensor pads.

11. The touch sensor-antenna module of claim 10, further comprising a capping layer formed on the antenna pad.

12. The touch sensor-antenna module of claim 10, wherein the capping pattern includes a transparent conductive oxide.

13. The touch sensor-antenna module of claim 1, further comprising a flexible printed circuit board bonded together with the antenna pad and the touch sensor pads on the bonding region.

14. The touch sensor-antenna module of claim 13, further comprising an antenna driving integrated circuit chip and a touch sensor driving integrated circuit chip electrically connected to the antenna pad and the touch sensor pads, respectively, through the flexible printed circuit board.

15. The touch sensor-antenna module of claim 1, wherein the radiator and the sensing electrodes have a mesh structure.

16. The touch sensor-antenna module of claim 1, wherein the radiator and the sensing electrodes are disposed at the same level.

17. A display device comprising the touch sensor-antenna module of claim 1.

* * * * *